(12) United States Patent
Anand et al.

(10) Patent No.: US 9,098,865 B2
(45) Date of Patent: Aug. 4, 2015

(54) ULTRASONIC NEAR-FIELD COMMUNICATION

(75) Inventors: Abheek Anand, San Francisco, CA (US); Soham Mazumdar, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 325 days.

(21) Appl. No.: 13/442,122

(22) Filed: Apr. 9, 2012

(65) Prior Publication Data
US 2013/0171930 A1   Jul. 4, 2013

Related U.S. Application Data

(60) Provisional application No. 61/473,089, filed on Apr. 7, 2011.

(51) Int. Cl.
| | |
|---|---|
| *H04B 5/00* | (2006.01) |
| *G06Q 30/02* | (2012.01) |
| *G06Q 20/32* | (2012.01) |
| *G07C 9/00* | (2006.01) |
| *H04B 11/00* | (2006.01) |

(52) U.S. Cl.
CPC ........ *G06Q 30/0226* (2013.01); *G06Q 20/3278* (2013.01); *G07C 9/00182* (2013.01); *H04B 5/0031* (2013.01); *H04B 11/00* (2013.01)

(58) Field of Classification Search
USPC .................. 455/41.1–41.3, 550.1, 556.1, 557
See application file for complete search history.

(56) References Cited

U.S. PATENT DOCUMENTS

| | | | |
|---|---|---|---|
| 2009/0098825 A1* | 4/2009 | Huomo et al. ............... 455/41.1 |
| 2010/0203833 A1* | 8/2010 | Dorsey .......................... 455/41.2 |
| 2011/0029416 A1 | 2/2011 | Greenspan | |
| 2011/0112898 A1* | 5/2011 | White ......................... 705/14.38 |
| 2012/0051187 A1 | 3/2012 | Paulson | |
| 2012/0171963 A1* | 7/2012 | Tsfaty ........................... 455/41.3 |
| 2012/0238209 A1* | 9/2012 | Walker et al. ................ 455/41.2 |
| 2013/0173315 A1* | 7/2013 | Dorsey ............................. 705/5 |

FOREIGN PATENT DOCUMENTS

CN           102722812 A    * 10/2012

OTHER PUBLICATIONS

Hachman, Mark, "MobilePay: Your Phone is Your Credit Card", http://www.pcmag.com/article2/0,2817,2369877,00.asp, Sep. 28, 2010.

Siegler, MG, "MobilePay May be the Death of the Wallet Yes, for Real This Time," http://techcrunch.com/2010/09/28/mobilepayusa/, Sep. 28, 2010.

Hardawar, D., "Naratte's Zoosh Enables NFC with Just a Speaker and Microphone," http://venturebeat.com.2011/06/19/narattes-zoosh-enables-nfc-with-just-a-speaker-and-microphone/, Jun. 19, 2011.

\* cited by examiner

*Primary Examiner* — Fayyaz Alam
(74) *Attorney, Agent, or Firm* — Baker Botts, L.L.P.

(57) ABSTRACT

Systems and methods for near-field communications with a mobile device are disclosed. In one embodiment, a computer-implemented method for near-field communication may comprise: detecting, by a source device located at a point-of-sale, the proximity of a receiving device; encoding purchase data on an audio signal with one or more ultrasonic frequencies; and transmitting the encoded purchase data to the receiving device, wherein the encoded purchase data is transmitted using a speaker of the source device.

26 Claims, 4 Drawing Sheets

ULTRASONIC NEAR-FIELD COMMUNICATION

CROSS-REFERENCE TO RELATED APPLICATIONS

This application claims priority to U.S. Provisional Application 61/473,089, entitled ULTRASONIC NEAR-FIELD COMMUNICATION, filed Apr. 7, 2011, which is hereby incorporated by reference in its entirety.

TECHNICAL FIELD

Various embodiments of the present disclosure generally relate to systems and methods for short distance communication. In particular, embodiments of the present disclosure relate to systems and methods for near-field communications with a mobile device.

BRIEF DESCRIPTION OF THE DRAWINGS

One or more embodiments of the present disclosure are illustrated by way of example and not limitation in the figures of the accompanying drawings, in which like references indicate similar elements.

DETAILED DESCRIPTION

Figure 1:
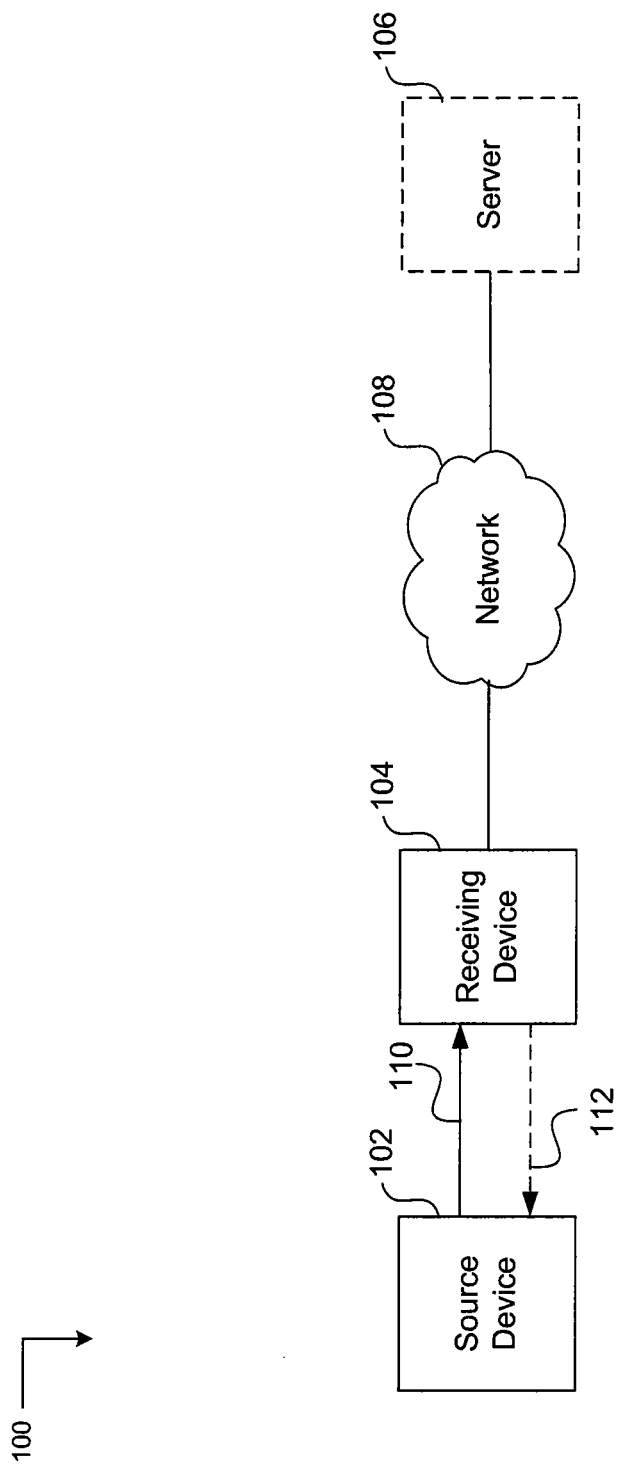
FIG. 1 illustrates an exemplary ultrasonic near-field communication system according to one embodiment(s) of the present disclosure.

Systems and methods for short distance communication are described. In particular, various embodiments of the present disclosure relate to systems and methods for providing near-field communications with a mobile device. In some embodiments, the system and method for near-field communications may not require a mobile device to have specialized hardware. Standard components (e.g., a microphone and speaker) of a mobile device to perform near-field communications with another device, e.g., a point-of-sale device or a second mobile device. The mobile device may be, for example, a smartphone, a personal digital assistant (PDA), a tablet computer, iPod©, a laptop computer, a notebook computer, a netbook computer, or a custom hardware device.

In accordance with various embodiments, systems and methods described may apply to both unidirectional and bidirectional communication. In the unidirectional communication, a data source device (e.g., a point-of-sale device) may send information to a receiving device (e.g., the mobile device). The unidirectional communication may be used, for example, in a customer loyalty program where a point-of-sale device transmits sales data to a customer's mobile device and a rewards application uses the sales data to track the customer's progress towards earning rewards. In some embodiments, a mobile device acting as a key fob may transmit key information to an electronic lock. The electronic lock may then verify the transmitted key information and unlock the lock if the key information is valid.

In some embodiments, the bidirectional communication can be used. Both devices may act as a source and a receiving device. A more complex communication protocol may be implemented in bidirectional communication to coordinate the communication between the communicating devices. Two mobile device users may exchange data (e.g., contact information, messages, etc.) through the bidirectional communication.

In accordance with various embodiments, audio signals may be used to transmit data between the source and receiving device. Typically, audio signals in the 1 KHz to 22 KHz range may be used for data transmission. The speakers of the source device may emit audio signals in these frequencies and the microphone of the receiving device may receive the audio signals. In one embodiment, frequencies in the 16 KHz to 22 KHz range are used to make the sounds inaudible to most humans. However, any range of audio signals may be used for communication in accordance with the embodiment(s) of the present disclosure.

The data transmitted by the source device may be encoded on the audio signal. In one embodiment, the data transfer may be done in bursts, where each burst is an audio signal with the same spectral characteristics, sustained over a predefined period of time (e.g., on the order of 40 ms). Each burst may encode a fixed number of bits of information. The data encoded by a single burst may be determined by the relative amplitude of certain defined frequencies. A similar technique, known as dual-tone multi-frequency (DTMF), may be used in transmitting numeric data in telephone lines (e.g., dialed-number, caller-id, etc.).

In some embodiments, K non-overlapping frequency bands in the 16 KHz to 22 KHz spectrum and N frequencies within each of the K bands may be used to encode the data. Each burst may include an audio signal containing a signal from each of the K bands and last a predefined period of time (e.g., 20 ms). A complete data transmission may include a sequence of bursts, separated by a period (e.g., 20 ms) of silence. Each unique K-tuple of frequencies detected on the receiver may correspond to a specific data value, and therefore each burst may encode $K*\log(N)$ bits of information. These frequencies may be chosen from the output range of the sending device, and in a manner that minimizes frequency distortions on the recipient side. Typically, smartphones are capable of generating and sampling audio at or above 44 KHz, and hence by the Nyquist-Shannon sampling theorem, frequencies of up to 22 KHz may be generated and detected with these devices. However, frequencies used in the near-field communication may be chosen according to the capability of the devices.

The receiving device may analyze the received audio signal for presence of any of the $K*N$ well-known frequencies that the data source is using for its encoding. In one embodiment, the receiving device may analyze the received signal using a Fourier Transform, for example, a Fast-Fourier Transform (FFT) or a Discrete FFT, or by using other algorithms such as the Goertzel algorithm for frequency detection. Once the receiving device has detected the set of predominant frequencies, the receiving device may be able to decode the information encoded in the audio signal.

In some embodiments, other known techniques may be used to encode data, for example, phase shift keying (PSK), amplitude shift keying (ASK), frequency shift keying (FSK), and quadrature amplitude modulation (QAM), among others.

In one embodiment, in order to communicate more data than may be communicated by a single burst, a series of bursts may be constructed suitably to encode larger packets of data. A frame may include a header, a payload, and error correcting codes. The header may be a fixed width header including frame information. The payload may be a fixed width payload or a variable width payload. The variable width payload may be implemented by, for example, encoding the data size in first X bits of the payload. The error correcting codes may include, for example, CRC codes or Reed-Solomon codes to ensure data integrity in the presence of noise.

In accordance with various embodiments, the signal may be encoded in redundant frequency bands to provide signal robustness in indoor and outdoor environments, where there may be audio interference. For example, in the case of M-way redundancy, instead of encoding data on K frequency bands, data is encoded on M*K frequency bands, where each original band is replicated M times. The presence of non-conflicting data on any one of the redundant bands is sufficient to decode information for that band. This redundancy may help avoid situations where persistent background signals on any of the encoded frequencies interferes with the encoded signal. With the above scheme, the system may tolerate up to (M−1) persistent noise frequencies on each band, and a total of K*(M−1) persistent noise frequencies. Various other methods of providing redundancy may be used to make communication robust in noisy environments within the scope of the disclosure, as those skilled in the relevant art will recognize.

Many known security policies may be employed to provide secure data transmission in accordance with embodiments of the present disclosure. In a unidirectional communication scenario, security may be provided by generating a key_id for the device, where key_id=HMAC_SHA1 (message=id, key=master_key). The key_id and id may be stored in non-volatile memory or data storage on the source device. The source device, in order to send a secure transmission, pads the data (e.g., adds zeros to the data) and encrypts the padded data using the key_id. In some embodiments, the data may include the date/time of the transmission. Common encryption techniques may be used, for example, Advanced Encryption Standard 128 (AES-128). The encrypted data and the id may then be transmitted to the receiving device.

The data may be validated at the receiving device by decrypting the encrypted data based on a key_id generated using the id included in the transmission. In one embodiment, the message may be rejected if the padding is not zero. In another embodiment, the message may be rejected if the date/time included in the data is not within a defined limit of the current date/time. Otherwise, the encrypted data may be accepted as valid.

Other known encryption and data verification techniques may be employed for unidirectional and bidirectional communication, as those skilled in the relevant art will recognize. For example, any protocol in the secure sockets layer (SSL) suite may be used for bidirectional communication, assuming the data verifier is a certificate drafting authority.

FIG. 1 illustrates an exemplary ultrasonic near-field communication system according to one embodiment(s) of the present disclosure. The system may include a source device 102, a receiving device 104, and optionally a server 106 coupled with the receiving device 104 through a network 108. This system may typically be employed where the source device and the receiving device are asymmetrical in capability (e.g., network connectivity). The source device 102 may not be capable of connecting to the server 106 through the network 104. The source device 102 transmits data 110 to the receiving device 104. In one embodiment, the source device 102 may also be capable of receiving data 112. The receiving device 104 receives data 110 from the source device 102, and in some embodiments may transmit data 112 to the source device 102. In one embodiment, the receiving device 104 may be capable of verifying the data with the server 106 through the network 108.

The server 106 may provide a centralized control point for services implemented in accordance with embodiments of the present disclosure. The server 106 may be used as, for example, a database to store details of transactions between the devices. The server 106 may also serve, as described further below, as an authentication intermediary. Finally, the server 106 may be used as a repository for device identities and other device associated metadata.

Figure 2:
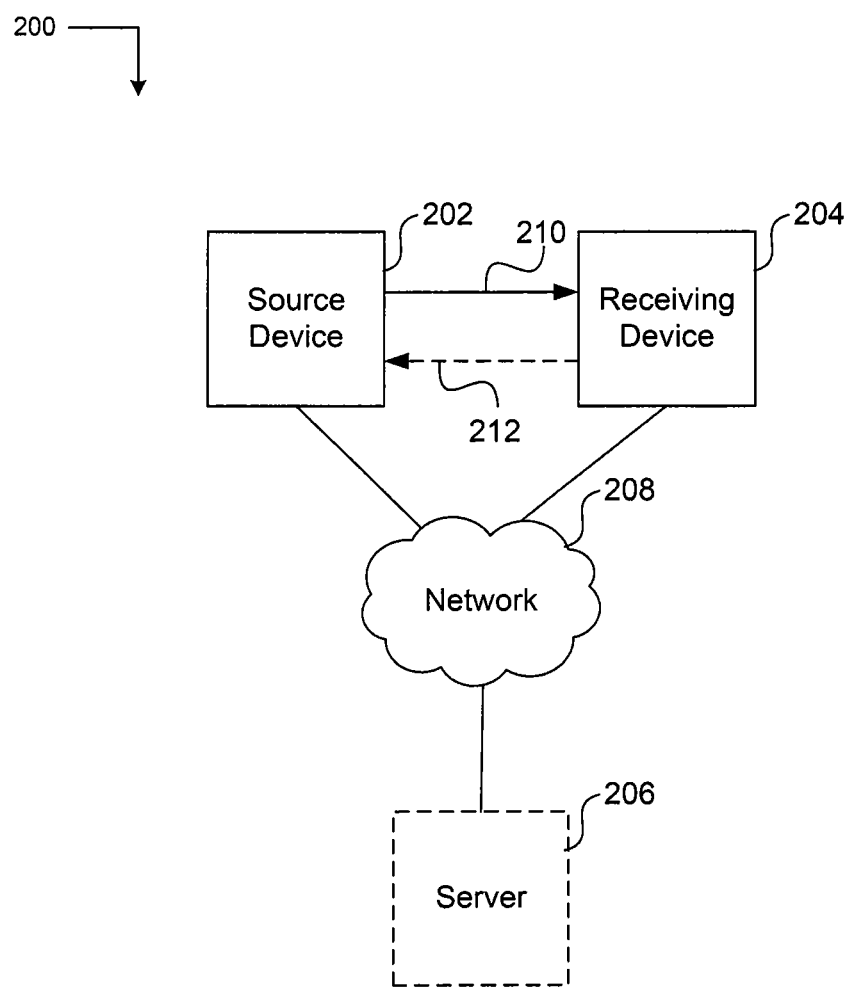
FIG. 2 illustrates another exemplary ultrasonic near-field communication system according to one embodiment(s) of the present disclosure.

FIG. 2 illustrates another exemplary ultrasonic near-field communication system according to one embodiment(s) of the present disclosure. The system may include a source device 202, a receiving device 204, and optionally a server 206 coupled with the source device 202 and the receiving device 204 through a network 208. The source device 202 may transmit data 210 to the receiving device 204. In one embodiment, the source device 202 may also be capable of receiving data 212. The receiving device 204 receives data 210 from the source device 202, and in some embodiments may transmit data 212 to the source device 202. In one embodiment, the receiving device 204 and the source device 202 may be capable of verifying the data with the server 206 through the network 208.

Figure 3:
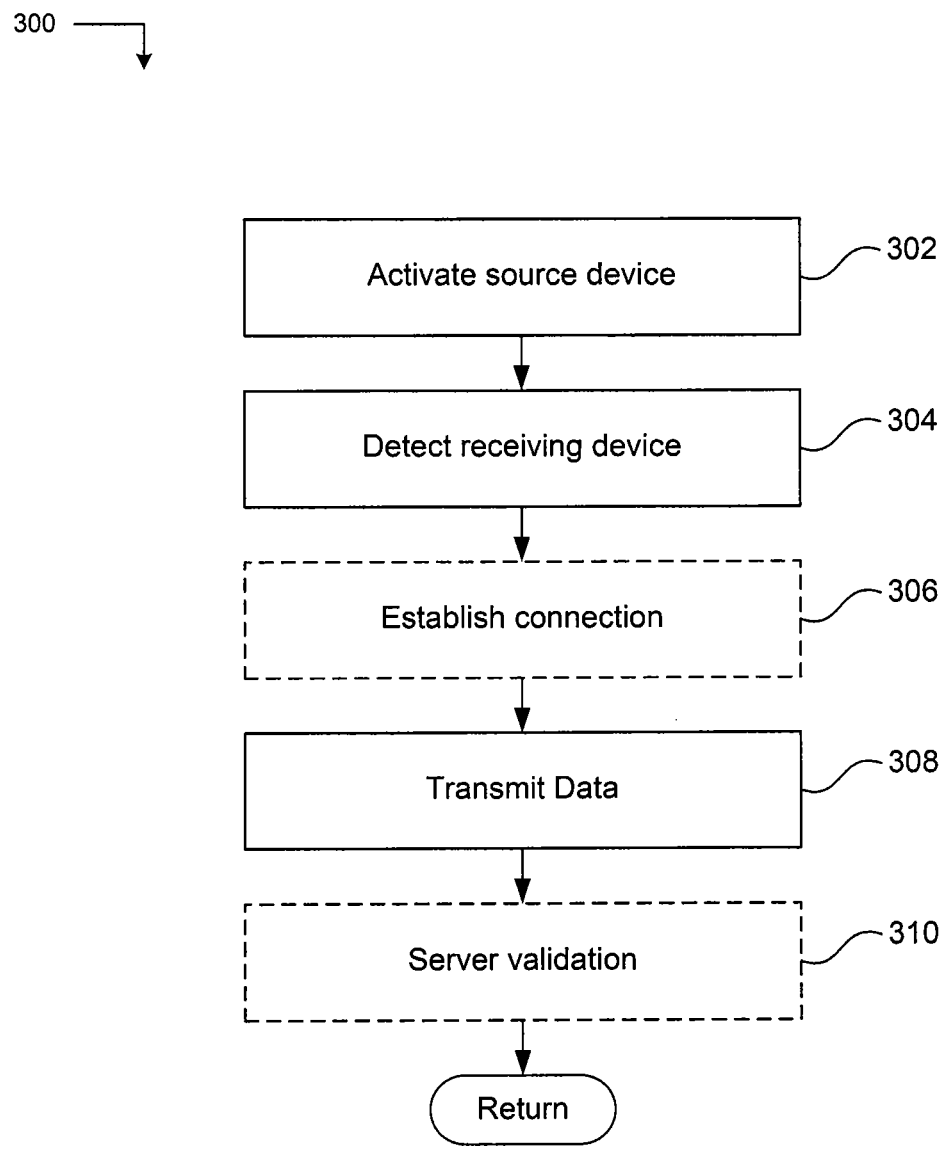
FIG. 3 illustrates a flowchart showing an exemplary communication session between devices in accordance with yet another embodiment(s) of the present disclosure.

FIG. 3 illustrates a flowchart showing an exemplary communication session between devices in accordance with yet another embodiment(s) of the present disclosure. The following process is depicted as a flow chart of ordered steps. However, it should be understood that at least some of the operations associated with the process may potentially be reordered, supplemented, or substituted for while still performing the same overall technique. At step 302, the source device may be activated. In one embodiment, the source device may be activated by an operator. In this case, the operator may interact with the source device, for example, by pressing a button on the source device or interacting with a touch-sensitive portion of the source device, to activate the source device. The source device may remain activated, for example, for either a fixed period of time or until it receives a confirmation about pairing from the recipient.

In other embodiments, an external device may interact with the source device to activate the device. For example, the source device may be wired to an external device (e.g., a computer) which is capable of sending an electronic activation signal to the source device. In another embodiment, the external device may send a wireless signal to activate the source device. In another embodiment, the source device may be equipped with sensors. For example, the source device may include an IR sensor, an ultrasound detector, or an antenna to detect the proximity of a receiving device. The source device may also include an accelerometer and/or gyroscope to detect motion to activate the device. In another embodiment, the source device may always be activated.

At step 304, the source device may detect the presence of the sending device. In the bidirectional communication, in response to detecting the presence of the sending device, at step 306, a communication session may be established between the source device and the receiving device. In the unidirectional communication, after the communication session has been established at step 308, the source device may transmit the data to the receiving device. In one embodiment, at step 310, the source or receiving device may validate the data with a server through a network.

Figure 4:
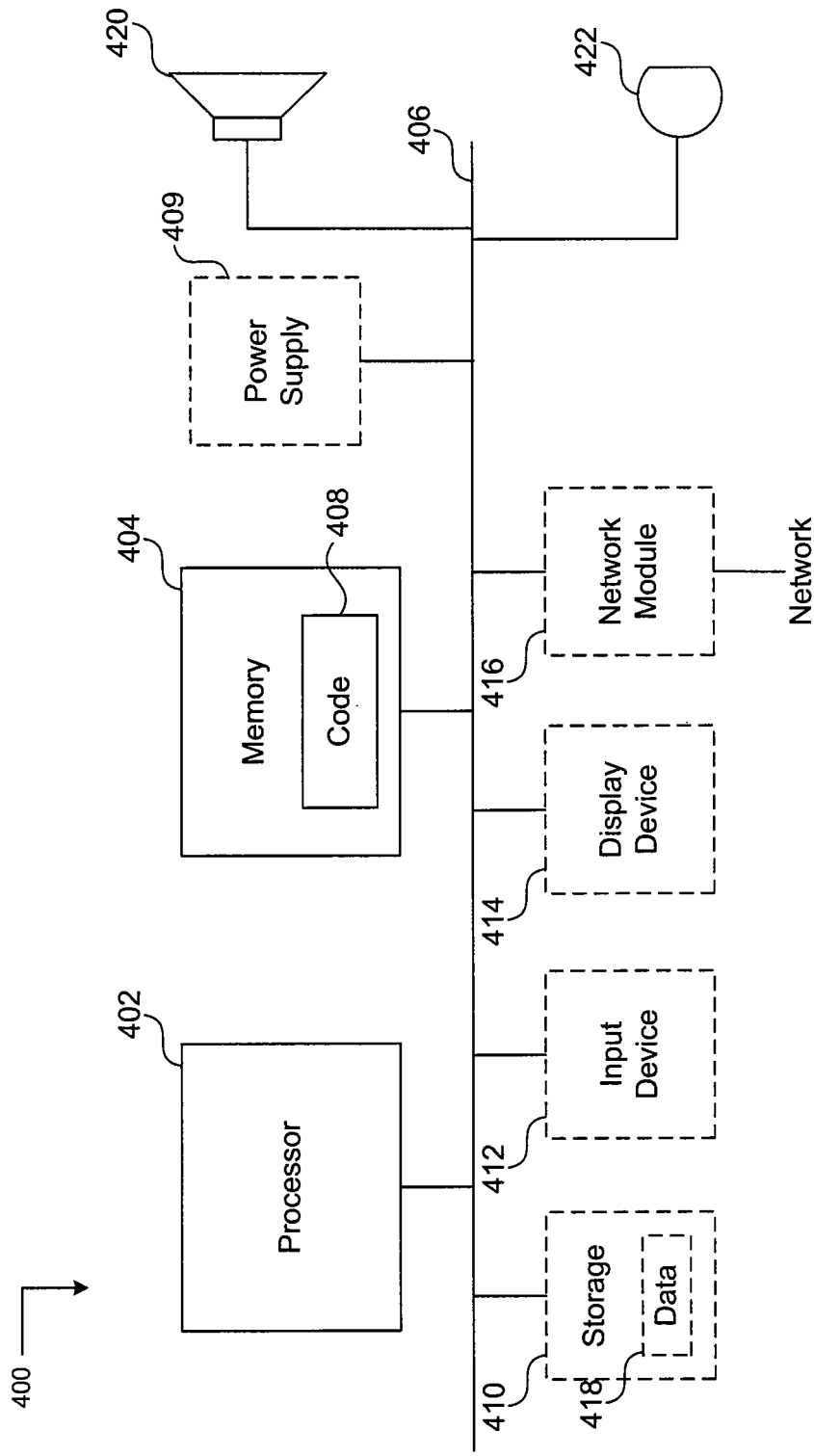
FIG. 4 illustrates a block diagram of an exemplary device that may be used to implement the source and/or receiving device in accordance with yet another embodiment(s) of the present disclosure.

FIG. 4 illustrates a block diagram of an exemplary device 400 that may be used to implement the source and/or receiving device in accordance with yet another embodiment(s) of the present disclosure. As illustrated in FIG. 4, the device 400 is a processing system that may include one or more processors 402. The device 400 may further include a memory 404, and optionally includes a storage module 410, an input device 412, a display device 414, and a network module 416, each of which may be interconnected by an interconnect 406 and powered by a power supply 409. In one embodiment, the power supply 409 may be an external power supply. The device 400 may include a speaker 420 and microphone 422 by which data may be transmitted and received in accordance with embodiments of the present disclosure.

The display device 414 may be configured to display information for viewing. Information for display may comprise textual, graphical, and/or multimedia information and may be presentable in a graphical user interface. In some embodiments, the display 414 may include a touch-sensitive screen that allows for direct manipulation of displayed information. The displayed information may also be manipulated by the input device 412. The input device 412 is configured to produce a signal based on user input. The signal may include a user selection that conveys the user input to the one or more processors 402, via the interconnect 406.

The memory 404 may comprise storage locations for storing software program code and data structures in accordance with embodiments of the present disclosure. The one or more processors 402, and the associated components may, in turn, include processing elements and/or logic circuitry configured to execute the software code and manipulate the data structures. The code 408, portions of which may typically stored in the memory 404 and executed by the one or more processors 402, may implement the communication operations in accordance with embodiments of the present disclosure. It will be apparent to those skilled in the art that other processing and memory implementations, including various computer-readable storage media, may be used for storing and executing program instructions pertaining to the technique introduced herein.

In one embodiment, the system and method described above may be used to implement a merchant loyalty program. A store owner or merchant may install a source device 102 or 202 at a point-of-sale terminal. The merchant may create an account with the server 106 or 206 in order to track and verify communication with customers. The merchant may define reward(s) for loyal customers, for example, free merchandise after a predefined purchase amount. After a customer has made a qualifying purchase, the source device may be activated and the customer may place the receiving device (e.g., the customer's smartphone) in proximity to the sending device. The receiving device may receive a communication from the sending device and save the data transmitted.

An application on the receiving device may track the purchases made by the customer. In one embodiment, each purchase may be verified with the server. In another embodiment, when the customer has accumulated sufficient purchases to receive a reward, all of the purchases are verified with the server at once. The receiving device may be configured to download data such as store address, reward details, etc. The customer may then present the receiving device to redeem the reward from the merchant. In one embodiment, the application may be configured to be suitable in situations with intermittent internet connectivity. For example, a store may be located in network blackout zones, a receiving device may be inside a building with poor network connection, or the receiving device may be an iPod-like device that only has wifi connectivity. In some embodiments, the application may be an iPhone© application or an Android© application.

In some embodiments, a certificate, printed from the receiving device or provided to the customer in some other manner (e.g., email, postal mail, etc.), may be presented to the merchant.

The system, in addition to tracking purchase information for loyalty programs, may be used in other business applications. For example, the system may be used for keyless locks or stored value purchase transactions. In a keyless entry system, the system and techniques introduced here may replace radio-frequency identification (RFID) for door locks, thus replacing key-cards with a device (e.g., a smartphone). In this scenario, the device acts as the source device while the card reader (which controls the lock) acts as the receiving device.

In a stored value purchase system, a stored value card may be loaded into the device (e.g., a smartphone). The stored value card may be loaded by, for example, installing an application on the smartphone and communicating with a server to add value to the "card." At the point-of-sale terminal, the smartphone may act as the source device and transmit the card identity to the receiving device. The receiving device (POS terminal) may be internet enabled and may deduct the appropriate amount from the "card." In another embodiment, the receiving device may be connected to a credit account or a bank account and the purchase amount may be charged to the credit account or deducted from the bank account.

References in this specification to "an embodiment," "one embodiment," or the like, mean that the particular feature, structure, or characteristic being described is included in at least one embodiment of the present invention. Occurrences of such phrases in this specification do not necessarily all refer to the same embodiment.

Those skilled in the art will appreciate that the invention may be embodied in other forms and manners not shown below. It is understood that the use of relational terms, if any, such as first, second, top, and bottom, and the like, are used solely for distinguishing one entity or action from another, without necessarily requiring or implying any such actual relationship or order between such entities or actions.

The foregoing processes are depicted as flow charts of ordered steps. However, it should be understood that at least some of the operations associated with these processes may potentially be reordered, supplemented, or substituted for while still performing the same overall technique.

The techniques introduced above may be implemented by programmable circuitry programmed or configured by software and/or firmware, or they may be implemented entirely by special-purpose "hardwired" circuitry, or in a combination of such forms. Such special-purpose circuitry (if any) may be in the form of, for example, one or more application-specific integrated circuits (ASICs), programmable logic devices (PLDs), field-programmable gate arrays (FPGAs), etc.

Software or firmware for implementing the techniques introduced here may be stored on a machine-readable storage medium and may be executed by one or more general-purpose or special-purpose programmable microprocessors. A "machine-readable medium," as the term is used herein, includes any mechanism that may store information in a form accessible by a machine (a machine may be, for example, a computer, network device, cellular phone, personal digital assistant (PDA), iPod©, manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic," as used herein, may include, for example, special-purpose hardwired circuitry, software, and/or firmware in conjunction with programmable circuitry, or a combination thereof.

Although the present invention has been described with reference to specific exemplary embodiments, it will be recognized that the invention is not limited to the embodiments described, but may be practiced with modification and alteration within the spirit and scope of the appended claims. Accordingly, the specification and drawings are to be regarded in an illustrative sense rather than a restrictive sense.

What is claimed is:

1. A computer-implemented method for near-field communication, comprising:
   detecting, by a source device located at a point-of-sale, the proximity of a receiving device;
   encoding purchase data as a series of burst audio signals with one or more ultrasonic frequencies; and
   transmitting the encoded purchase data to the receiving device, wherein the encoded purchase data is transmitted using a speaker of the source device,
   wherein each of the burst audio signals is a burst signal sustained over a predefined period of time, each of the burst signal encoded with a fixed number of bits of information,
   wherein each of the burst signals includes a signal from each of K non-overlapping ultrasonic frequency bands within a predefined spectrum, and wherein the signal lasts for the predefined period of time and K is an integer, and
   wherein N frequencies within each of the K non-overlapping ultrasonic frequency bands are used to encode the purchase data, and wherein N is an integer.

2. The method of claim 1, wherein the purchase data is encoded by phase shift keying (PSK), amplitude shift keying (ASK), frequency shift keying (FSK), or quadrature amplitude modulation (QAM).

3. The method of claim 1, wherein the encoded purchase data is analyzed for frequency detection with a Fourier Transform algorithm or a Goertzel algorithm.

4. The method of claim 1, wherein the source device is a cellular phone, a personal digital assistant (PDA), an iPod©, a manufacturing tool, or a device having one or more processors, one or more memory, and the speaker.

5. The method of claim 1, further comprising:
   activating the source device automatically by a sensor of the source device;
   wherein the sensor is an IR sensor, an ultrasound detector, or an antenna to detect the proximity of the receiving device; or is an accelerometer or a gyroscope to detect motion to activate the source device.

6. The method of claim 1, further comprising:
   activating the source device through an external device.

7. The method of claim 1, wherein the one or more ultrasonic frequencies in the predefined spectrum are between 16 KHz and 22 KHz.

8. The method of claim 1, wherein the series of burst audio signals includes a header, a payload, and error correcting codes.

9. The method of claim 8, wherein the audio signal is encoded in M-way redundant frequency bands, and wherein M is an integer.

10. An apparatus, comprising:
    one or more processors; and
    a computer-readable non-transitory storage medium storing one or more computer programs which, when executed by the one or more processors, cause the one or more processors to perform a set of operations for near-field communication, the one or more computer programs comprising:
    instructions to detect, by a source device located at a point-of sale, the proximity of a receiving device;
    instructions to encode purchase data as a series of burst audio signals with one or more ultrasonic frequencies; and
    instructions to transmit the encoded purchase data to the receiving device, wherein the encoded purchase data is transmitted using a speaker of the source device,
    wherein each of the burst audio signals is a burst signal sustained over a predefined period of time, each of the burst signal encoded with a fixed number of bits of information,
    wherein each of the burst signals includes a signal from each of K non-overlapping ultrasonic frequency bands within a predefined spectrum, and wherein the signal lasts for the predefined period of time and K is an integer, and
    wherein N frequencies within each of the K non-overlapping ultrasonic frequency bands are used to encode the purchase data, and wherein N is an integer.

11. The apparatus of claim 10, wherein the one or more computer program(s) is an iPhone© application or an Android© application.

12. The apparatus of claim 10, wherein the purchase data is encoded by phase shift keying (PSK), amplitude shift keying (ASK), frequency shift keying (FSK), or quadrature amplitude modulation (QAM).

13. The apparatus of claim 10, wherein the encoded purchase data is analyzed for frequency detection with a Fourier Transform algorithm or a Goertzel algorithm.

14. The apparatus of claim 10, wherein the source device is a cellular phone, a personal digital assistant (PDA), an iPod©, a manufacturing tool, or a device having one or more processors, one or more memory, and the speaker.

15. The apparatus of claim 10, wherein the one or more computer program(s) further comprises instructions to activate the source device automatically by deploying a sensor of the source device; wherein the sensor is an IR sensor, an ultrasound detector, or an antenna to detect the proximity of the receiving device; or is an accelerometer or a gyroscope to detect motion to activate the source device.

16. The apparatus of claim 10, wherein the one or more ultrasonic frequencies in the predefined spectrum are between 16 KHz and 22 KHz.

17. The apparatus of claim 10, wherein the series of burst audio signals includes a header, a payload, and error correcting codes.

18. The apparatus of claim 17, wherein the audio signal is encoded in M-way redundant frequency bands, and wherein M is an integer.

19. The apparatus of claim 10, wherein the one or more computer program(s) further comprises instructions to:
    activate the source device through an external device.

20. One or more computer-readable non-transitory storage media storing instructions operable, when executed by a processor, to:
    detect, by a source device located at a point-of sale, the proximity of a receiving device;
    encode purchase data as a series of burst audio signals with one or more ultrasonic frequencies; and
    transmit the encoded purchase data to the receiving device, wherein the encoded purchase data is transmitted using a speaker of the source device, wherein each of the burst audio signals is a burst signal sustained over a predefined period of time, each of the burst signal encoded with a fixed number of bits of information, wherein each of the burst signals includes a signal from each of K non-overlapping ultrasonic frequency bands within a predefined spectrum, and wherein the signal lasts for the predefined period of time and K is an integer, and wherein N frequencies within each of the K non-overlapping ultrasonic frequency bands are used to encode the purchase data, and wherein N is an integer.

21. The media of claim 20, wherein the one or more computer program(s) is an iPhone© application or an Android© application.

22. The media of claim 20, wherein the purchase data is encoded by phase shift keying (PSK), amplitude shift keying (ASK), frequency shift keying (FSK), or quadrature amplitude modulation (QAM).

23. The media of claim 20, wherein the encoded purchase data is analyzed for frequency detection with a Fourier Transform algorithm or a Goertzel algorithm.

24. The media of claim 20, wherein the source device is a cellular phone, a personal digital assistant (PDA), an iPod©, a manufacturing tool, or a device having one or more processors, one or more memory, and the speaker.

25. The media of claim 20, wherein the instructions further comprise instructions to activate the source device automatically by deploying a sensor of the source device; wherein the sensor is an IR sensor, an ultrasound detector, or an antenna to detect the proximity of the receiving device; or is an accelerometer or a gyroscope to detect motion to activate the source device.

26. The media of claim 20, wherein the one or more ultrasonic frequencies in the predefined spectrum are between 16 KHz and 22 KHz.

\* \* \* \* \*